(12) United States Patent
Azinger

(10) Patent No.: US 7,328,141 B2
(45) Date of Patent: Feb. 5, 2008

(54) TIMELINE PRESENTATION AND CONTROL OF SIMULATED LOAD TRAFFIC

(75) Inventor: Frederick A. Azinger, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 598 days.

(21) Appl. No.: 10/817,734

(22) Filed: Apr. 2, 2004

(65) Prior Publication Data

US 2005/0220282 A1    Oct. 6, 2005

(51) Int. Cl.
G06F 9/455 (2006.01)

(52) U.S. Cl. ................... 703/6; 709/241; 709/234; 455/423; 455/446

(58) Field of Classification Search .............. 703/13; 709/241, 234; 455/423, 446; 370/252; 701/210, 701/117, 213
See application file for complete search history.

(56) References Cited

U.S. PATENT DOCUMENTS

| | | | |
|---|---|---|---|
| 6,028,847 A * | 2/2000 | Beanland | 370/252 |
| 6,442,615 B1 * | 8/2002 | Nordenstam et al. | 709/241 |
| 2002/0188749 A1 * | 12/2002 | Gaur | 709/234 |
| 2003/0069683 A1 * | 4/2003 | Lapidot et al. | 701/117 |
| 2003/0100299 A1 * | 5/2003 | Ko et al. | 455/423 |
| 2004/0073361 A1 * | 4/2004 | Tzamaloukas et al. | 701/210 |
| 2004/0268224 A1 | 12/2004 | Balkus et al. | |
| 2005/0090978 A1 * | 4/2005 | Bathory et al. | 701/213 |
| 2007/0037579 A1 * | 2/2007 | Francalanci et al. | 455/446 |

OTHER PUBLICATIONS

Fowler et al., "Local area network traffic characteristics, with implications for broadband network congestion management", IEEE 1991.*
Ma et al., "Characteristics of WAP traffic", Wireless networks, Jan. 2004.*
Lagoa et al., "Decentralized optimal traffic engineering in the internet", Computer communication Review, Oct. 2000.*
Kahil et al., "Data traffic in centralized switch node architecture for LAN", Computer communication Review, Jan. 1994.*
Burrell et al., "A comprehensive approach to signaling, transmission, and traffic management for wireless ATM networks", Wireless networks, Sep. 2001.*
Phuvoraval et al., "Fast timescale control for MPLS traffic engineering", University of Maryland, Apr. 2002.*

* cited by examiner

Primary Examiner—K. Thangavelu
(74) Attorney, Agent, or Firm—Francis I. Gray; Matthew D. Rabdau

(57) ABSTRACT

A user interface for a traffic load simulator for a telecommunication system divides call traffic into sub-groups of call traffic that have a common characteristic. Such sub-groups may include rush hour callers, lunch time callers, teenagers, internet surfers, business customers and other background callers that do not fit into any one sub-group. Each sub-group is represented as a timeline on a display where the traffic for the sub-group is simulated with ramp up and decline rates corresponding to the rate at which calls are added to the system or disconnected from the system and steady state volume between the ramp up and decline, all as a function of time-of-day. The timelines may be manipulated by graphically changing the rates, steady state volume and time-of-day for the events. In this manner realistic traffic loads on the system may be simulated to determine times and nodes when and where the system may be overwhelmed.

10 Claims, 1 Drawing Sheet

US 7,328,141 B2

TIMELINE PRESENTATION AND CONTROL OF SIMULATED LOAD TRAFFIC

BACKGROUND OF THE INVENTION

The present invention relates to telecommunication system testing, and more particularly to a timeline presentation and control of simulated load traffic.

In telecommunication systems having nodes, such as central terminals or base stations, and a plurality of terminals or handsets, communication between users at the terminals or handsets is routed along different routes via the nodes. If a large number of users are making calls simultaneously, a particular node may be overwhelmed and some information content may get lost. To simulate such a system in order to provide a design that does not get overwhelmed by a large number of users requires the specification of test traffic flows for a huge number of active subscribers. Such specification is complex and unwieldy to generate, is laborious and time consuming.

What is desired is a technique for determining the telecommunication system behavior under various traffic loads corresponding to a huge number of active subscribers that is easy and intuitive to use.

BRIEF SUMMARY OF THE INVENTION

Accordingly the present invention provides a timeline presentation and control of simulated traffic by sub-dividing call traffic into sub-groups of call traffic that have a common characteristic. Such sub-groups may include rush hour callers, lunch time callers, teenagers, internet surfers, business customers and other background callers that do not fit into any one sub-group. Each sub-group is represented as a timeline on a display where the traffic for the sub-group is simulated with ramp up and decline rates corresponding to the rate at which calls are added to the system or disconnected from the system and with steady state volume between the ramp up and decline, all as a function of time-of-day. The timelines may be manipulated by graphically changing the rates, steady state volume and time-of-day for the events. In this manner realistic traffic loads on the system may be simulated to determine times and nodes when and where the system may be overwhelmed.

The objects, advantages and other novel features of the present invention are apparent from the following detailed description when read in conjunction with the appended claims and attached drawing.

DETAILED DESCRIPTION OF THE INVENTION

Figure 1:
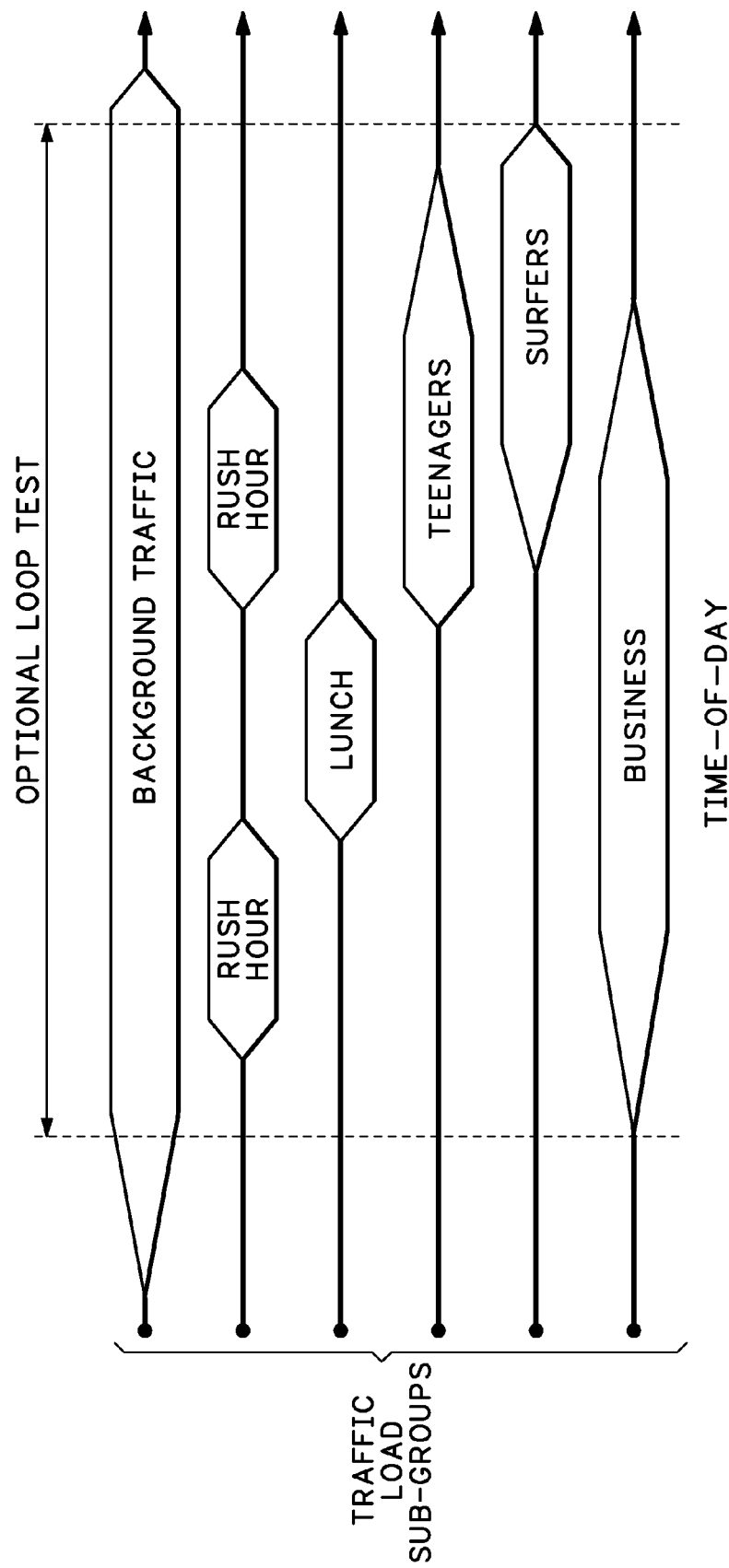
FIG. 1 is a graphic display view of a timeline presentation according to the present invention.

In order to reduce the problem of specifying test traffic flows for a huge active number of subscribers, or users, on a mobile telecommunication system, the present invention provides a way to allow an operator of a traffic load simulator to manipulate smaller sub-sets of subscribers that have a common characteristic. One common way to think about mobile users is perhaps by time-of-day events that are common for many people—such as rush hours. The time-of-day events may be over a portion of a day or over many days, since some system operators run multi-day tests. Knowing system behavior under the transient harmonic-convergence of peaky traffic groups is the objective of testing. Therefore by splitting traffic into time-of-day events, a timeline may be built to simulate how real-world traffic comes and goes during the day on the system.

Major traffic groups of users may be segregated into small clusters that may be represented by a few traffic profiles that have something in common—short voice calls, "gold" service, SMS traffic, etc. For each traffic group ramp rates for how fast the traffic ramps up or declines as well as steady state traffic volume between ramp up and decline are high level adjustments. Adjusting a temporal relationship between traffic groups may be a convenient slide-along-the-timeline interface, as is well known in the art. The groupings may occur across many traffic nuances and/or Internet Service Operator (ISO) protocol layers. For example the operator may want to observe video traffic generally, or "Platinum-Level" video traffic for compliance with Service Level Agreements (SLAs).

Referring now to FIG. 1 a graphic display of system traffic load on a traffic load simulator device shows that the traffic load is split into several sub-groups, such as background traffic, rush hour traffic, lunch time traffic, teenager traffic, internet surfer traffic, "gold" level business traffic, etc. In other words for a test period of time an operator specifies that some background traffic persists throughout the test period; that a couple of time-of-day blocks are specified for both morning and evening rush hours—maybe lots of people making short calls or mobile calls requiring hand-offs between nodes that overload base stations; that another group makes calls during the lunch hour; that teenagers after-school make hour-long multi-party calls; and that late-night surfers and gold-level Service Level Agreement business customers who pay the bills form other separate groups.

Once modeled like this, it becomes a day in the life of the system element under test. Of course the operator may add impulse traffic events, such as a bad call that ends a Super Bowl game in controversy which may generate a lot of calls in a short period of time, Chinese New Years which may generate a lot of congratulatory calls in a short period of time, etc. These impulse events may be moved around the timeline to coincide or miss other events. The ability to easily go in and change something, like the level of business traffic, makes it easy for an operator to test the system. Also optional looping may be added so tests may simulate real days, or just so a test runs indefinitely.

The user may have separate timelines for each of the caller traffic sub-groups as shown, or may merge the separate timelines into a single master timeline so that the impact of variations introduced within the different sub-groups on the overall traffic load pattern may be observed. The operator, using typical computer graphical interface techniques, readily manipulates the different ramp and decline rates and the "steady-state" call volume for each sub-group on the timelines. Although shown as one-dimensional timelines with a constant amplitude for the respective steady-states volumes, the timelines may be represented graphically in two-dimensions as "amplitude" versus time, where "amplitude" represents the number of calls, for example. The ramp up and decline rates correspond to the rates at which calls are added to the overall volume, i.e., connected to the system, or subtracted from the overall volume, i.e., disconnected from the system. By knowing the capacity of the nodes in the system, the timelines may point out times in the day when traffic has to be routed differently to avoid any one node from being overwhelmed, or may indicate the need for additional nodes in the system, or may indicate the need for a particular node to be updated by increasing its capacity.

Thus the present invention provides a user interface for a telecommunication system load traffic simulator to build up realistic traffic loads by sub-dividing caller traffic load into sub-groups having a common characteristic, whether by time-of-day or by type of call, and by plotting the sub-groups on a timeline that indicates ramp up and decline rates for each sub-group as well as a steady state volume.

What is claimed is:

1. A user interface method for simulating traffic load on a telecommunication system comprising the steps of:
   sub-dividing the traffic load into traffic load sub-groups having common characteristics;
   generating for each traffic load sub-group a timeline display showing ramp up and decline rates as well as steady state volume as a function of time-of-day during a test period based on the common characteristics; and
   manipulating the timeline displays to change the ramp up and decline rates, the steady state volume, and the time-of-day along the timeline displays to simulate realistic traffic loading of the telecommunication system.

2. The user interface method as recited in claim 1 further comprising the step of generating from the traffic load sub-group timelines a traffic load timeline that is a combination of at least two of the traffic load sub-group timelines.

3. The user interface method of claim 1 or 2 wherein the common characteristics comprise ones selected from the group consisting of time-of-day events and call type events.

4. The user interface method as recited in claim 3 wherein each traffic load sub-group timeline display comprises a one-dimensional timeline display having a ramp up region, a steady state volume region and a decline region for the represented traffic load sub-group.

5. The user interface method as recited in claim 3 wherein each timeline display comprises a two-dimensional timeline display with volume of calls along a first axis and time-of-day along a second axis having a ramp up region, a steady state volume region and a decline region for the represented traffic load sub-group.

6. A user interface display for a traffic load simulator which simulates traffic load on a telecommunication system comprising:
   a plurality of manipulable timeline displays, one for each of a corresponding plurality of sub-groups into which the traffic load is divided, each sub-group having a common characteristic and each timeline display having a ramp up region, a steady state volume region and a decline region as a function of time-of-day for the represented sub-group during a test period,
   wherein each timeline display is manipulable to change the ramp up and decline regions, the steady state volume, and the time-of-day along the timeline display to simulate realistic traffic loading of the telecommunication system.

7. The user interface display as recited in claim 6 wherein the plurality of manipulable timelines further comprises a traffic load timeline that is a combination of all the sub-group timelines.

8. The user interface display as recited in claim 6 or 7 wherein the common characteristic comprises one selected from the group consisting of time-of-day events and call type events.

9. The user interface display as recited in claim 6 or 7 wherein the timelines each comprise a one-dimensional graphic display.

10. The user interface display as recited in claim 6 or 7 wherein the timelines each comprise a two-dimensional graphic display with volume of calls along a first axis and time-of-day along a second axis.

* * * * *